United States Patent
Tani et al.

(10) Patent No.: US 6,605,335 B2
(45) Date of Patent: Aug. 12, 2003

(54) MAGNETIC RECORDING MEDIUM

(75) Inventors: Hiroshi Tani, Naka (JP); Hiroyuki Matsumoto, Cigasaki (JP); Mitsuhiro Shyoda, Odawara (JP); Tomonori Kozaki, Odawara (JP); Takayuki Nakakawaji, Kitaibaragi (JP); Yoko Ogawa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 119 days.

(21) Appl. No.: 09/861,642

(22) Filed: May 22, 2001

(65) Prior Publication Data

US 2002/0006531 A1 Jan. 17, 2002

(30) Foreign Application Priority Data

May 22, 2000 (JP) .......................... 2000-154395

(51) Int. Cl.$^7$ ................................. G11B 5/72
(52) U.S. Cl. .................. 428/141; 428/336; 428/408; 428/421; 428/694 TC; 428/694 TF
(58) Field of Search ................ 428/141, 336, 428/408, 421, 694 TC, 694 TF

(56) References Cited

U.S. PATENT DOCUMENTS

| RE32,464 E | 7/1987 | Aine ........................ 428/622 |
| 5,908,817 A | 6/1999 | Perettie et al. .............. 508/422 |

FOREIGN PATENT DOCUMENTS

| JP | 59-154641 | 9/1984 |
| JP | 61-126827 | 6/1986 |
| JP | 6-220077 | 8/1994 |
| JP | 8-106629 | 4/1996 |
| JP | 9-305961 | 11/1997 |
| JP | 10-251676 | 9/1998 |
| JP | 11-267696 | 10/1999 |
| JP | 11-328647 | 11/1999 |
| JP | 2000-105916 | 4/2000 |

OTHER PUBLICATIONS

Journal of Applied Polymer Science, "Measurements of Carbon Thin Films Using X-Ray Reflectivity", vol. 66, No. 4, 1989, pp. 1861–1863.

*Primary Examiner*—Stevan A. Resan
(74) *Attorney, Agent, or Firm*—Mattingly, Stanger & Malur, P.C.

(57) ABSTRACT

The present invention provides a magnetic recording media made possible to improve reliability and durability of the magnetic recording media with an extremely thin overcoat. A magnetic recording media made by forming at least a magnetic coat and an overcoat on a substrate of non-magnetic magnetic disk on which surface a liquid lubricant having a structure of perfluoropolyether is coated, wherein average roughness of overcoat surface Ra is less than 0.8 nm, said overcoat being a diamond-like-carbon with a thickness in a range of 1.5–4.5 nm, and said lubricant on said carbon overcoat containing a lubricant component having a structure represented by chemical formula (1):

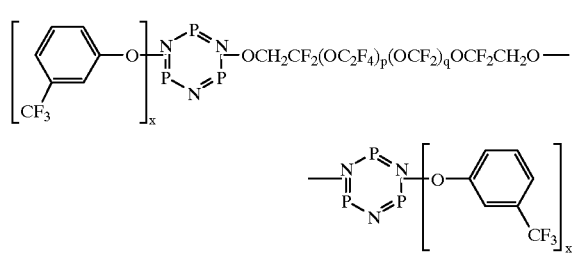

(where, p=5–36, q=4–30, x=1–5).

6 Claims, 2 Drawing Sheets

MAGNETIC RECORDING MEDIUM

BACKGROUND OF THE INVENTION

1. Field of the Invention

This invention relates to a magnetic recording media made by forming a under layer, a magnetic layer and an overcoat on a substrate of a non-magnetic magnetic disk, over which a liquid lubricant having a structure of perfluoropolyether is coated, particularly to a magnetic disk media having a very thin overcoat of several nano meters.

2. Description of the Related Art

Recording density of the magnetic disk devices is remarkably increasing and even a density of more than 10 G bits per square inches has been announced recently. In order to achieve such a high recording density, it is mandatory to bring the space between magnetic head and magnetic recording layer of the magnetic disk as close as possible, to the extent of less than 20 nm at present level.

Most of this space is occupied by overcoat thickness on the magnetic recording layer on the magnetic disk and flying height of magnetic head. Therefore, overcoat thickness and flying height of the magnetic head are in a trade-off relationship. For a magnetic disk, an overcoat thickness as thin as possible, but with a high wear resistance should the magnetic head touch the overcoat, is required. Judging from the current space between magnetic head and magnetic recording layer of magnetic disk, the future task is to achieve a thickness of less than 5 nm.

In the recent magnetic disk devices, load-and-unload (L/UL) method is more and more employed than the conventional contact-start-stop (CSS) method. In the L/UL method, magnetic head is unloaded parting from the magnetic disk when the disk is stopped, and when the disk starts to rotate, the magnetic head is loaded on the disk. On the other hand, in the conventional CSS method, the magnetic head stays in contact with the disk, and when the disk starts to rotate, magnetic head flys up by air flow caused by rotation. However, in the L/UL method, although requirement for wear resistance is mitigated to some extent, the disk should withstand to a shock when loading on, and a sudden contact by a mal positioning of the magnetic head which can happen even in normal operation.

With respect to overcoat, as disclosed in the U.S. Pat. No. Re. 32464, carbon based materials have been used heretofore. Many methods for enhancing hardness of the carbon based overcoat to make it thinner have been proposed. For example, a method of adding hydrogen, as disclosed in the Japanese Patent Laid-Open S 59-154641, and a method of adding nitrogen in a sputtering process, as disclosed in the Japanese Patent Laid-Open H 8-106629, to increase hardness of carbon based overcoat and make it thinner.

Attention has been riveted since many years to diamond-like-carbon (DLC) which has especially high hardness among the carbon based overcoats. Many methods for preparation of DLC have been proposed such as Japanese Patent Laid-Open S59-154641, as cited before, describing a chemical vapor deposition method (heretofore abbreviated as CVD method) in which carbon is deposited on a substrate by decomposing hydrocarbon gas by electric discharge, or ion beam deposition method (heretofore abbreviated as IBD method) in which a hydrocarbon is ionized by irradiation of thermoion which is generated by a heated filament, and carbon is deposited on a substrate by collision of the said ion beam accelerated by bias voltage applied to the substrate.

Particularly the IBD method is easy to form an overcoat having a high hardness, as described in the $24^{th}$ column of the Japanese Patent Laid-Open 2000-105916, teaching that "by using a thermal filament, plasma can be generated under much lower pressure than in conventional CVD method, and as monomer molecules are less concentrated, decomposition of the monomer is more complete."

On the other hand, as described in the Japanese Patent Laid-Open S61-126827, waer resistance of the carbon based overcoat is not improved merely by increasing its hardness, but it is necessary to use fluorine based lubricant such as those having a perfluoropolyether structure at the same time. Thus, optimization of combination with lubricant is an important factor in designing magnetic disk.

Recently, to improve performance of the lubricant, mixing an additive having cyclic phosphazene, as described in the U.S. Pat. No. 5,908,817, and a lubricant having cyclic phosphazene at the end of perfluoropolyether, as described in the Japanese Patent Laid-Open H6-220077, are proposed. Moreover, a technology to add a cyclic phosphazene to the end of perfluoropolyether as shown in the chemical formula (1) was developed recently by Matsumura Oil Research Corp., (the Japanese Patent Application H11-267696).

With respect to the technology of mixing an additive having a cyclic phosphazene structure with perfluoropolyether lubricant is disclosed in the Japanese Patent Laid-Open H9-305961 and the Japanese Patent Laid-Open H10-251676. Example of the prior art shows that, by forming the above mentioned film on DLC overcoat, reduction of friction force, improvement of durability, reduction in contamination of the head and suppression of lubricant decomposition are achieved.

Furthermore, it is known, as described in the Japanese Patent Laid-Open H11-328647, that material for base-coat of magnetic recording layer also affects wear resistance of magnetic disk.

SUMMARY OF THE INVENTION

Comparing to the nitrogen-added carbon overcoat, in case of the diamond-like-carbon (DLC), as described above, although the film hardness is high, easiness of heat generation in the magnetic disk device and lubricant spin-off due to air shear force by rotation of the disk have been the problems. Therefore, it is necessary to find out not only the kind of overcoat material, but also an optimal combination with lubricant in order to achieve enough wear resistance with overcoat thickness of less than 5 nm.

On the other hand, the less the roughness of surface of magnetic disk is, the closer the magnetic head can approach to the disk, resulting in an advantage of increasing recording density. However, in case a sudden contact of the magnetic head happens, more damage could be given to the overcoat because of a large friction due to a large contact surface area between the magnetic head and the magnetic disk. Therefore, the proper surface roughness should be selected.

Furthermore, in case overcoat has a large Young's modulus, deformation of the overcoat is small leading to a smaller contact area for the head, and a higher contact pressure resulting therefrom tends to promote waer. Also from this point of view, it is important to find out an optimal combination of overcoat material, lubricant and roughness of the surface.

As shown in the Japanese Patent Laid-Open H9-305961 and the Japanese Patent Laid-Open H10-251676, a lubricant coat made by mixing an additive having cyclic phosphazene structure tends to cause contamination of the head, leading to a larger friction force. This contamination is caused by phase separation of the additive which sticks to the head. As the phase separation of additive depends on the overcoat material, and an increase in friction force depends on surface shape of the magnetic disk, it is necessary to find out an optimal combination of lubricant, overcoat and surface shape.

The inventors of the present invention, after studied various combination of overcoat, overcoat thickness, lubricant and surface roughness, has found out that by using a diamond-like-carbon (DLC) prepared by IBD method and lubricant as defined by the chemical formula (1), and making surface roughness (Ra) of magnetic disk, i.e. average surface roughness of the overcoat less than 0.8 nm, an enough durability is achieved even with overcoat thickness of less than 5 nm, i.e. from 1.5 to 4.5 nm, and that above achievement is not realized if any one of the diamond-like-carbon, lubricant of the chemical formula (1) or Ra lacks.

Where the upper limit of Ra was defined because it was found that a larger Ra causes rather reduction of wear resistance.

Namely, in the magnetic recording media made by forming an underlayer, a magnetic layer and an overcoat on a non-magnetic magnetic disk, on which surface a liquid lubricant having a perfluoropolyether structure is coated, the feature of this invention is in a magnetic recording media where the said overcoat has an average roughness, Ra, of its surface less than 0.8 nm, made of diamond-like carbon, having a thickness within the range of 1.5–4.5 nm, and the lubricant layer on the overcoat contains lubricant component having the structure defined by chemical formula (1).

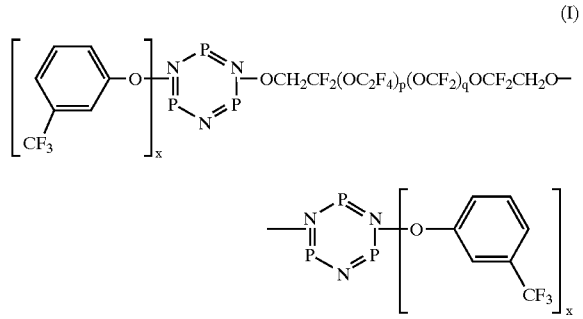

(where p=5–36, q=4–30 and x=1–5)

DETAILED DESCRIPTION OF THE PREFERRED EMBODIMENTS

Figure 1:
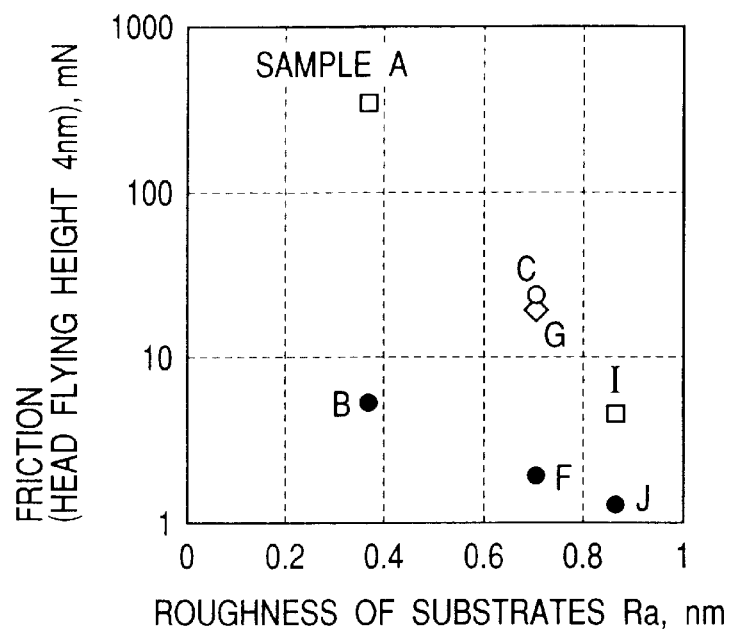
FIG. 1 is a figure showing change in friction force with change in surface roughness of substrate.

In the present invention, a glass substrate available in the market for magnetic disk is suitably used as a substrate for non-magnetic magnetic disk. In order to reflect difference in surface roughness of the magnetic disk, those having Ra of 0.35–0.8 nm, and Rp 4.0–7.0 nm were prepared.

For the magnetic layer, Co alloy is generally used. Under the magnetic layer, an underlayer made of Cr alloy, and a seed layer made by Co alloy or Ni alloy etc.

An overcoat mainly composed of carbon is formed on a magnetic layer. For the overcoat, a diamond-like carbon formed by IBD method is suitable. Thickness of the overcoat was within a range of 1.5 nm–4.5 nm.

In this case, lubricant can be a mixture of a lubricant having a structure defined by chemical formula (1) and Fombrin Z-DOL™, as long as the lubricant of the chemical formula (1) is contained more than 30%. Furthermore, it is preferred that the main chain of the lubricant of the chemical formula (1) has an average molecular weight of 1,500–2,500.

The present invention is described in more detail by the following embodiments. Reference and test samples were prepared as shown in Table 1, with kind of substrate, kind of overcoat, thickness of overcoat, kind of lubricant, thickness of lubricant and heat treatment temperature as parameters.

TABLE 1

Embodiment and comparative example of the present invention

| Sample No. | Kind of substrate | Kind of overcoat | Overcoat thickness | Lubricant | Heat treatment | Lubricant thickness | Note |
|---|---|---|---|---|---|---|---|
| A | Substrate 1 | Overcoat 4 | 4.0 nm | Z-DOL ™ | 80° C. | 1.5 nm | Comparison |
| B | Substrate 1 | Overcoat 4 | 4.0 nm | Chemical formula (1) | 80° C. | 1.5 nm | Embodiment |
| C | Substrate 2 | Overcoat 1 | 4.0 nm | Chemical formula (1) | 80° C. | 1.5 nm | Comparison |
| D | Substrate 2 | Overcoat 2 | 4.0 nm | Chemical formula (1) | 80° C. | 1.5 nm | Embodiment |
| E | Substrate 2 | Overcoat 3 | 4.0 nm | Chemical formula (1) | 80° C. | 1.5 nm | Embodiment |
| F | Substrate 2 | Overcoat 4 | 1.0–5.0 nm | Chemical formula (1) | 80° C. | 1.5 nm | Embodiment |
| G | Substrate 2 | Overcoat 1 | 1.0–5.0 nm | Z-DOL ™ | 80° C. | 1.5 nm | Comparison |
| H | Substrate 2 | Overcoat 4 | 4.0 nm | Chemical formula (1) | 80–120° C. | 1.5 nm | Embodiment |
| I | Substrate 3 | Overcoat 4 | 4.0 nm | Z-DOL ™ | 80° C. | 1.5 nm | Comparison |
| J | Substrate 3 | Overcoat 4 | 4.0 nm | Chemical formula (1) | 80° C. | 1.5 nm | Comparison |

A glass substrate of 65 mm diameter was purchased and used for Embodiment shown in Table 1. Three substrates with different roughness were used. Substrate 1 (Ra 0.37 nm, Rp 5.45 nm) and Substrate 2 (Ra 0.71 nm, Rp 5.58 nm) illustrate the embodiment of the present invention, while Substrate 3 (Ra 0.87 nm, Rp 7.38 nm) has a higher roughness for comparative example. Kind and measured surface shape of the substrates are shown in Table 2.

TABLE 2

Kind of the substrates

| Sample | Roughness of substrate | |
|---|---|---|
| | Ra, nm | Rp, nm |
| Substrate 1 | 0.37 | 5.45 |
| Substrate 2 | 0.71 | 5.58 |
| Substrate 3 | 0.87 | 7.38 |

Roughness of substrate was measured by AFM (Scanning probe microscope Nanoscope III™ manufactured by Digital Instruments) in tapping mode with scanning size of 10×10 μm, scan rate of 1 Hz, number of samples 512, Z-limit 440V, filter treatment Flatten, cantilever made of single crystal silicone, and tip curvature radius of 5–20 nm. Average roughness, Ra, and maximum profile peak height, Rp, are automatically calculated by this AFM device. Measurement were made several times and the average value was employed. Scattering of the values were 0.1 nm for average roughness, Ra, and about 1.5 nm for maximum profile peak height, Rp.

Coating was made on a substrate after washing, using MDP-250™ (manufactured by Intevac). First, the substrate was heated to 230° C., and then coated with a 40 nm layer of NiCrZr alloy, over which 10 nm CoCrZr layer was coated. Those layers are called seed layer for controlling crystal formation in undercoat. Further on this, 25 nm of CrTi alloy layer was formed as undercoat, on which CoCrPt alloy layer was formed as magnetic layer.

Two different overcoats were formed for comparison. One was a carbon coat formed by sputtering method, and another was a diamond-like carbon coat formed by IBD method. Coating equipment manufactured by Intevac was used for both cases, attached to the above mentioned MDP-250™ chamber. As coating condition for sputtering method, coating rate of 0.5 nm/s and sputtering gas composed of 18% nitrogen in argon were employed. On the other hand, for coating by IBD method, coating rate of 1.0 nm/s, emission current of 0.5 A, bias voltage difference of 200V and ethylene gas concentration of 55% (Overcoat 2), 61% (Overcoat 3) and 71% (Overcoat 4) were employed. In order to investigate dependence of the overcoat on thickness, G and F in Table 1 represents overcoat formed with thickness of 1.0, 2.0, 3.0, 4.0, 4.5, 5.0 nm respectively. Thickness of overcoat was measured quantitatively by X ray reflection method after coating 5 nm Cr on the overcoat to improve accuracy of the measurement. SLX2000™ manufactured by Rigaku Denki was used with X ray of CuK α1 for the quantitative measurement of the thickness. The principle of the measurement is described in the Journal of Applied Physics 66(4) p1861, Aug. 15, 1989.

The surface roughness after forming overcoat was approximately the same as that of the measured value for the substrate (within ±10%).

Moreover, as hardness and Young's modulus of magnetic recording media depend on the kind of overcoat and the conditions of coating process, hardness and Young's modulus of magnetic recording media were measured by the following method: NanoIndenter™ (manufactured by MTS) was used as a measuring equipment to determine hardness and Young's modulus by CSM mode (Continuous Stiffness Mode) at 10 nm penetration. Hardness and modulus of elasticity at overcoat thickness of 4 nm were shown in Table 3.

TABLE 3

Variation of hardness and Young's modulus according to kind of overcoat

| Sample | Kind of overcoat (thickness 4 nm) | | Hardness (Gpa) | Modulus of direct elasticity (Gpa) |
|---|---|---|---|---|
| | Process | Other condition | | |
| Overcoat 1 | Sputtering | | 10.5 | 132 |
| Overcoat 2 | IBD | Ethylene 55% | 14.5 | 165 |
| Overcoat 3 | IBD | Ethylene 61% | 13.1 | 158 |
| Overcoat 4 | IBD | Ethylene 71% | 13.4 | 150 |

Two different kinds of lubricant were applied. For comparative example, a lubricant with average molecular weight of 3,000 which was made by graduating Fombrin Z-DOL™ produced by Ausimout was applied. In one embodiment of the present invention, a lubricant having a structure of chemical formula (1) was synthesized from a lubricant with average molecular weight of 2,000 made by graduating Fombrin Z-DOL™. However, this lubricant is not 100% lubricant of formula (1), but, assuming that functional end group of formula (1) being modified at both ends of PFPE based on the NMR (Nuclear Magnetic Resonance) analysis for hydrogen and fluorine, about 30% is represented by the chemical formula (1), while remaining 70% is Fombrin Z-DOL™. Assuming that the raw material Fombrin Z-DOL™ has some molecular weight distribution and the same distribution still remained after synthesis, p and q in the chemical formula (1) was estimated approximately as p=5–36, q=4–30. X in the chemical formula (1) is considered to be in a range of X=1–5, but this was not confirmed. For respective lubricant, lubricant coat was formed by dipping the magnetic disk media in a lubricant solution of various concentration using Sumitomo 3M's HFE7100™ as solvent, and pulling out the magnetic disk media therefrom. Then the magnetic disk media was heat treated at temperatures 80° C., 100° C., 120° C. for 30 minutes. Lubricant coat thickness was measured by FTIR (Fourier Transform Infrared Spectroscopy), and Fombrin Z-DOL™ was taken as equivalent to 0.5, 1.0, 1.5 nm coat thickness.

Furthermore, a magnetic disk for detecting phase separation of lubricant and contamination of head was prepared as follows: Lubricant having a structure represented by chemical formula (1) was applied in Example H with various ratio of the lubricant to Fombrin Z-DO™. Concentration of the lubricant was varied as 10, 15, 20, 50, 75 and 100%, and the lubricant coat thickness was adjusted to be 1.5 nm. As a comparative example, cyclic tri-phosphazene additive was added in Example H with various weight ratio.

Reliability and durability of those samples were evaluated by the following way; for evaluation of wear resistance at ultra low flying condition, the head was placed always in contact with magnetic disk media by reverse rotation of motor, and the time needed for crushing was measured while seeking the magnetic recording media between 15–31 mm radius. The environment temperature was 65° C. and the rotation speed was 4,000 min$^{-1}$. Furthermore, in order to evaluate the vibration when the magnetic head touched the magnetic disk, contact friction force was measured by a friction sensor using a strain gauge, at flying height of the magnetic head of 4 nm and rotating speed of 4,000 min$^{-1}$ under reduced pressure in the test facility. Test results in the following examples illustrate the advantage of the present invention.

First, friction force measurement was made with samples A, B, C, F, G, I and J. The results are shown in FIG. 1. Overcoat thickness was set as 4 nm for all the samples. Lubricant coat thickness was 1.5 nm and the temperature for heat treatment was 80° C.

As clearly shown in the FIG. 1, friction force tends to increase with decreasing roughness of the substrate. Moreover, the friction force appears significantly reduced in the case of combination of overcoat 4 and the lubricant having structure represented by chemical formula (1). Namely, even with a low surface roughness of magnetic disk media (roughness equivalent to the substrate 1, 2), friction force is made dramatically lower in a combination of overcoat 4 and the lubricant having a structure represented by chemical formula (1) (Samples B, F) than those shown in the comparative examples (Samples A, C, G).

Figure 2:
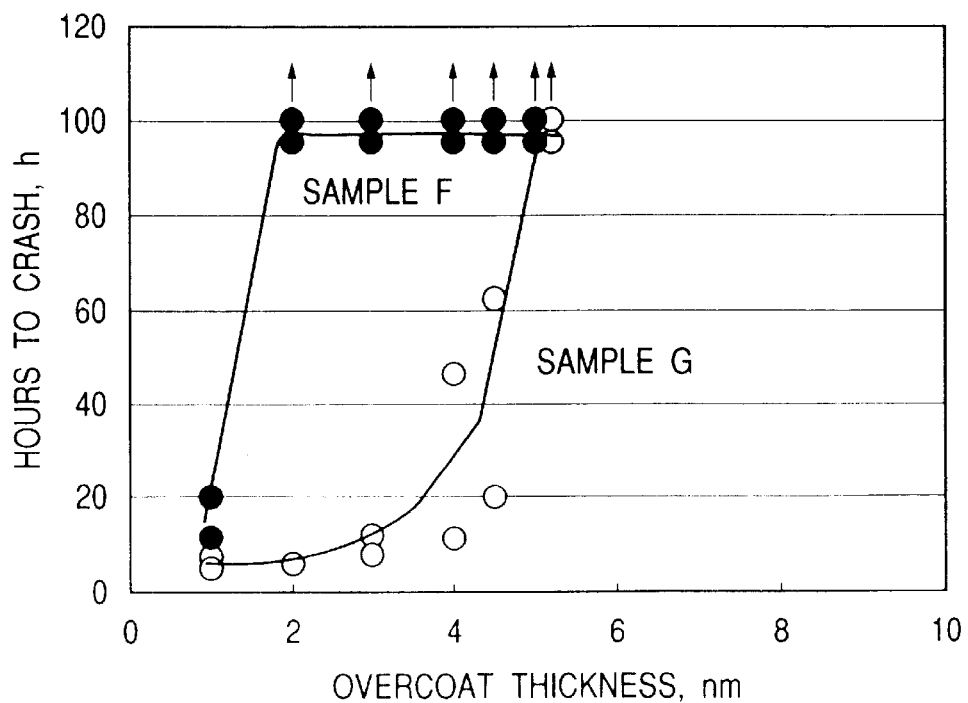
FIG. 2 illustrates effectiveness of this invention in a region of an ultra thin overcoat.

FIG. 2 shows results of wear resistance test with sample F and G. In contrast to the result in comparative example G, where the time until crush is extremely short, there was no crush in example F, which illustrates an improvement to more than 10 times higher durability.

From this result it was shown that, by the method as shown in the embodiment of the present invention cited herein, magnetic recording media with an extremely thin coat of several nm, which has been heretofore not reliable due to an easy crushing, becomes possible to be given an equivalent or more reliability than those conventional and practical magnetic recording media with overcoat thickness more than 5 nm.

Results of evaluation of wear resistance with Samples A–J with lubricant coat thickness of 1.5 nm according to embodiment and comparative example are shown in Table 4.

TABLE 4

Difference in wear resistance of each embodiment and comparative example

| Sample No. | Overcoat thickness | Hours to crash, h | |
|---|---|---|---|
| A | 4.0 nm | 8 | 6 |
| B | 4.0 nm | >100 | >100 |
| C | 4.0 nm | 16 | 11 |
| D | 4.0 nm | >100 | >100 |
| E | 4.0 nm | >100 | >100 |
| F | 4.0 nm | >100 | >100 |
| G | 4.0 nm | 16 | 11 |
| H-1 (80° C. treatment) | 4.0 nm | >100 | >100 |
| H-2 (100° C. treatment) | 4.0 nm | >100 | >100 |
| H-3 (120° C. treatment) | 4.0 nm | >100 | >100 |
| I | 4.0 nm | 3 | 6 |
| J | 4.0 nm | 10 | 8 |

Paying attention to the surface roughness of the substrate, comparison was made between Sample J with substrate 3 and Samples D, E, F with substrate 1, with a result that a good wear resistance is realized even in a case of small roughness. Moreover, paying attention to the kind of materials of overcoat, comparison between Samples D, E, F with overcoat 2, 3, 4 and Sample C with overcoat 1 shows that abrasion resistance significantly improves when the overcoat is formed by IBD method. Sample H has a good abrasion resistance independent of heat treatment temperature. As the lubricant having a structure represented by chemical formula (1) has better adsorption to carbon overcoat than conventional Fombrin Z-DOL™, proportion of the lubricant having structure represented by chemical formula (1) is supposed to increase by increasing the temperature of heat treatment.

Phase separation of lubricant was investigated by observing surface of the magnetic disk using optical microscopy for the examples with different dosage of the lubricant having a structure represented by chemical formula (1). The results are shown in Table 5.

TABLE 5

Occurrence rate of coagulation of lubricant

| | Additive concentration by weight (%) | | | |
|---|---|---|---|---|
| Additive lubricant | 10% | 20% | 50% | 100% |
| Comparative example | ○ | X | X | X |
| Embodiment | ○ | ○ | ○ | ○ |

○ no coagulation
X no coagulation

In the comparative example phase separation took place, while in the embodiment of the present invention with even 100% of the lubricant having a structure represented by chemical formula (1), there was no phase separation.

Figure 3:
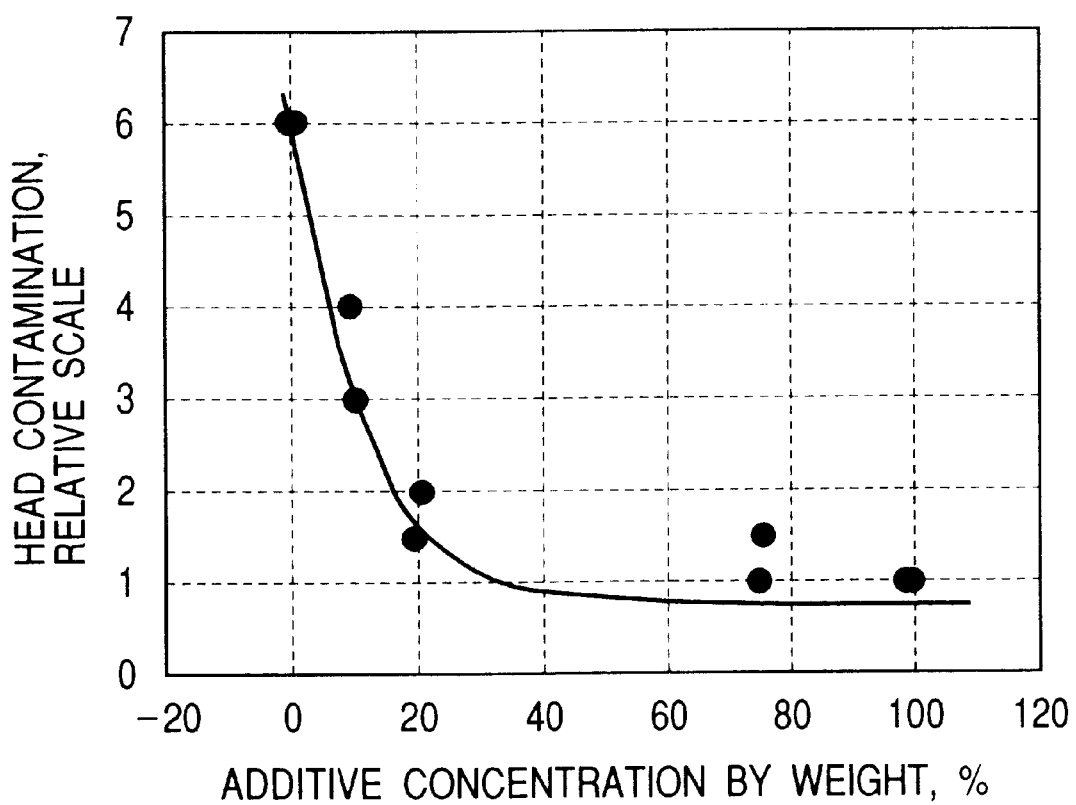
FIG. 3 is a figure showing relationship between lubricant concentration and head contamination.

Effect of lubricant dosage on head contamination was also investigated. A comparison was made by a numerical system of rating for contamination of head, after seeking the face of magnetic disk from inner to outer periphery by magnetic head for one hour. The results are shown in FIG. 3.

In a combination of an overcoat formed by CVD using ion beam and the lubricant having a structure represented by chemical formula (1), head contamination decreased with increasing dosage of the lubricant.

From above embodiment of the present invention, it is considered that the magnetic disk media with surface roughness equivalent to that of the substrates 1 and 2, with overcoat of diamond-like-carbon formed by using ion beam which is equivalent to that applied in the overcoat 2, overcoat 3, and overcoat 4, with an overcoat thickness of less than 5 nm, namely, 1.5–4.5 nm, and containing lubricant having a structure represented by chemical formula (1), has wear resistance equal to or more than conventional magnetic disk in spite of the extremely thin overcoat thickness.

Furthermore, scattering of lubricant during rotation of the magnetic disk media was tested by comparing thickness of lubricant coat before and after 12,000 min.-1,400 hours at environment temperature of 60° C. As a result, in Sample G, 43% of the lubricant coat remained, while in Sample F, 60% remained. Namely, a combination of overcoat formed by ion beam and lubricant having a structure represented by chemical formula (1) showed minimal scattering.

Thus, by the present invention, it has become possible to provide a highly reliable, durable magnetic recording media.

The present invention provides a magnetic recording media with an extremely thin overcoat which has superior wear resistance and high reliability equivalent to or more than conventional magnetic recording media.

What is claimed is:

1. A magnetic recording media made by forming at least a magnetic layer and an overcoat on a substrate of non-magnetic disk on which surface a liquid lubricant of a perfluoropolyether structure is coated, wherein surface of said overcoat having less than 0.8 nm average roughness Ra, said overcoat being a layer of diamond-like-carbon with less than 5 nm thickness, and said lubricant coat on said overcoat containing a lubricant component having a structure represented by following chemical formula (1):

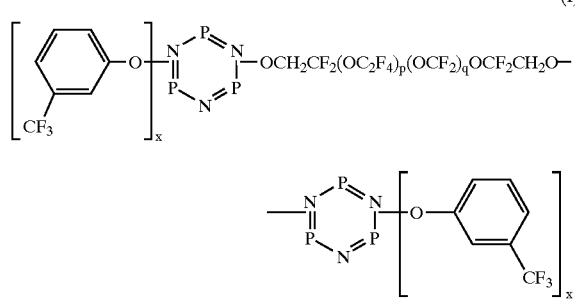

(where, $p=5–36$, $q=4–30$, $x=1–5$).

2. The magnetic recording media according to claim 1, wherein said lubricant coat on said overcoat contains more than 30% of a lubricant component having a structure represented by chemical formula (1).

3. The magnetic recording media according to claim 1, wherein principal chain of said lubricant component having a structure represented by chemical formula (1) has an average molecular weight of 1500–2500.

4. A magnetic recording media made by forming at least a magnetic layer and an overcoat on a substrate of non-magnetic magnetic disk on which surface a liquid lubricant of a perfluoropolyether structure is coated, wherein surface of said overcoat having less than 0.8 nm average roughness Ra, said overcoat being a layer of diamond-like-carbon with a thickness in a range of 1.5–4.5 nm, and said lubricant coat on said carbon overcoat containing a lubricant component having a structure represented by following chemical formula (1):

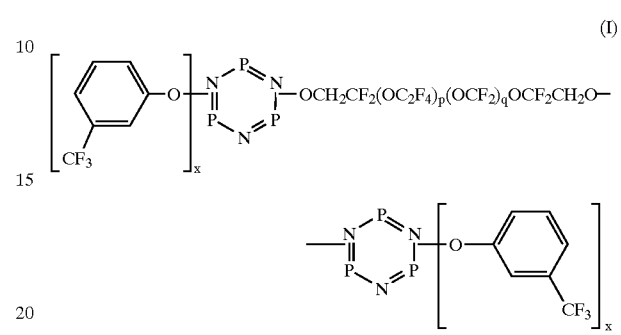

(where $p=5–36$, $q=4–30$, $x=1–5$).

5. The magnetic recording media according to claim 4, wherein said lubricant coat on said carbon overcoat contains more than 30% of lubricant component having a structure represented by chemical formula (1).

6. The magnetic recording media according to claim 4, wherein the principal chain of said lubricant having a structure represented by chemical formula (1) has an average molecular weight of 1500–2500.

* * * * *